(12) United States Patent
Lamboy et al.

(10) Patent No.: US 9,239,062 B2
(45) Date of Patent: Jan. 19, 2016

(54) LOW RADIUS RATIO FAN FOR A GAS TURBINE ENGINE

(75) Inventors: Jorge Orlando Lamboy, Liberty Township, OH (US); Nicholas Joseph Kray, Mason, OH (US); Gerald Alexander Pauley, Hamilton, OH (US); Qiang Li, Mason, OH (US); Daniel Allen Wilkin, II, West Chester, OH (US); Tod Winton Davis, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 759 days.

(21) Appl. No.: 13/608,754

(22) Filed: Sep. 10, 2012

(65) Prior Publication Data

US 2014/0219805 A1    Aug. 7, 2014

(51) Int. Cl.
*F04D 29/32* (2006.01)
*F01D 5/14* (2006.01)
*F01D 5/30* (2006.01)
*F01D 11/00* (2006.01)

(52) U.S. Cl.
CPC .............. *F04D 29/324* (2013.01); *F01D 5/147* (2013.01); *F01D 5/3007* (2013.01); *F01D 11/008* (2013.01); *F04D 29/329* (2013.01); *F05D 2220/3217* (2013.01); *F05D 2240/80* (2013.01); *F05D 2300/603* (2013.01); *Y02T 50/672* (2013.01); *Y02T 50/673* (2013.01)

(58) Field of Classification Search
CPC ... F04D 29/324; F04D 29/329; F01D 11/008; F01D 5/3007

USPC ...... 416/193 A, 223 A, 239, 248, 189, 193 R, 416/194
See application file for complete search history.

(56) References Cited

U.S. PATENT DOCUMENTS

| 6,217,283 | B1 * | 4/2001 | Ravenhall et al. ........ 416/193 A |
| 8,137,072 | B2 | 3/2012 | Kim et al. |
| 8,408,874 | B2 * | 4/2013 | McCaffrey et al. ....... 416/193 A |
| 8,770,938 | B2 | 7/2014 | Kreiselmaier et al. |

(Continued)

FOREIGN PATENT DOCUMENTS

| CN | 101782000 A | 7/2010 |
| CN | 102121400 A | 7/2011 |

(Continued)

OTHER PUBLICATIONS

PCT Search Report and Written Opinion dated Dec. 4, 2013, issued in connection with corresponding WO Patent Application No. PCT/US2013/058771.

(Continued)

*Primary Examiner* — Igor Kershteyn
*Assistant Examiner* — Woody A Lee, Jr.
(74) *Attorney, Agent, or Firm* — General Electric Company; William Scott Andes

(57) ABSTRACT

A fan blade for a gas turbine engine includes: a straight axial dovetail, an airfoil, and a transition section disposed between the dovetail and the airfoil, the fan blade having opposed pressure and suction sides, and further including at least one shoulder protruding from a nominal surface of a selected one of the pressure and suction sides, wherein the at least one shoulder includes a boss defining a side face, and an upper section extending radially outward from the boss and tapering inward to join a nominal surface of the selected side.

13 Claims, 5 Drawing Sheets

(56) References Cited

U.S. PATENT DOCUMENTS

2009/0136356 A1* 5/2009 Beckford et al. ............ 416/239
2010/0166562 A1 7/2010 Boyer

FOREIGN PATENT DOCUMENTS

| CN | 102227545 | A  | 10/2011 |
|----|-----------|----|---------|
| EP | 1085172   | A2 | 3/2001  |
| EP | 1972757   | A1 | 9/2008  |
| EP | 1992786   | A2 | 11/2008 |
| EP | 2108785   | A2 | 10/2009 |

OTHER PUBLICATIONS

Unofficial English translation of Chinese Office Action issued in connection with corresponding CN Application No. 201380047083.3 on Aug. 4, 2015.

* cited by examiner

LOW RADIUS RATIO FAN FOR A GAS TURBINE ENGINE

BACKGROUND OF THE INVENTION

This invention relates generally to gas turbine engines, and more particularly to fan blades of a gas turbine engine.

A turbofan gas turbine engine used for powering an aircraft in flight typically includes, in serial flow communication, a fan assembly, a low pressure compressor or "booster", a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the booster via a second rotor shaft.

The fan assembly includes a plurality of circumferentially spaced apart fan blades extending radially outwardly from a rotor disk or hub. The fan blades generally comprise an airfoil and an integral dovetail at the airfoil root. The dovetail is received in a complimentary dovetail slot formed in the rotor disk. Fan blades are typically made of either a metal, such as titanium, or a composite material, such as a carbon-epoxy composite system. A radially inner flowpath boundary for the airflow channeled between the blades is provided by an array of fan platforms located between adjacent fan blades, near the rotor disk.

It is desirable for the fan to have the smallest possible radius ratio, i.e., the radius of the hub to the radius of the blade tips, because minimizing radius ratio maximizes fan inlet area and allows the greatest possible thrust for a given fan diameter.

The radius ratio may be lowered by reducing the hub diameter and placing the platforms as far radially inboard as possible. However, some fan blade designs incorporate a straight axial dovetail, requiring a large radial transition area between cambered airfoil and straight dovetail. This design also does not allow for disk to form part of the platform.

Accordingly, there is a need for a fan blade structure incorporating a straight axial dovetail which is compatible with an inboard position of adjacent platforms.

BRIEF DESCRIPTION OF THE INVENTION

This need is addressed by the present invention, which provides a fan blade having a straight axial dovetail and a transition section which incorporates one or more protruding shoulders configured to interface with an inter-blade platform.

According to one aspect of the invention, a fan blade for a gas turbine engine includes: a straight axial dovetail, an airfoil, and a transition section disposed between the dovetail and the airfoil, the fan blade having opposed pressure and suction sides, and further including at least one shoulder protruding from a nominal surface of a selected one of the pressure and suction sides, wherein the at least one shoulder includes a boss defining a side face, and an upper section extending radially outward from the boss and tapering inward to join a nominal surface of the selected side.

According to another aspect of the invention, a rotor assembly includes: a rotor disk including an annular array of dovetail slots; an array of fan blades each having: a straight axial dovetail engaged in one of the dovetail slots of the rotor, an airfoil, and a transition section disposed between the dovetail and the airfoil, the fan blade having opposed pressure and suction sides, and further including first and second shoulders protruding from nominal surfaces of the pressure and suction sides, respectively, each shoulder including a boss defining a side face, and an upper section extending radially outward from the boss and tapering inward to join a nominal surface of the respective side of the fan blade, wherein a plurality of spaces are present between adjacent fan blades; and an array of platforms disposed in the spaces between adjacent fan blades, each platform having an outer surface defining a portion of a flowpath boundary and abutting the side faces of the shoulders of adjacent blades.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
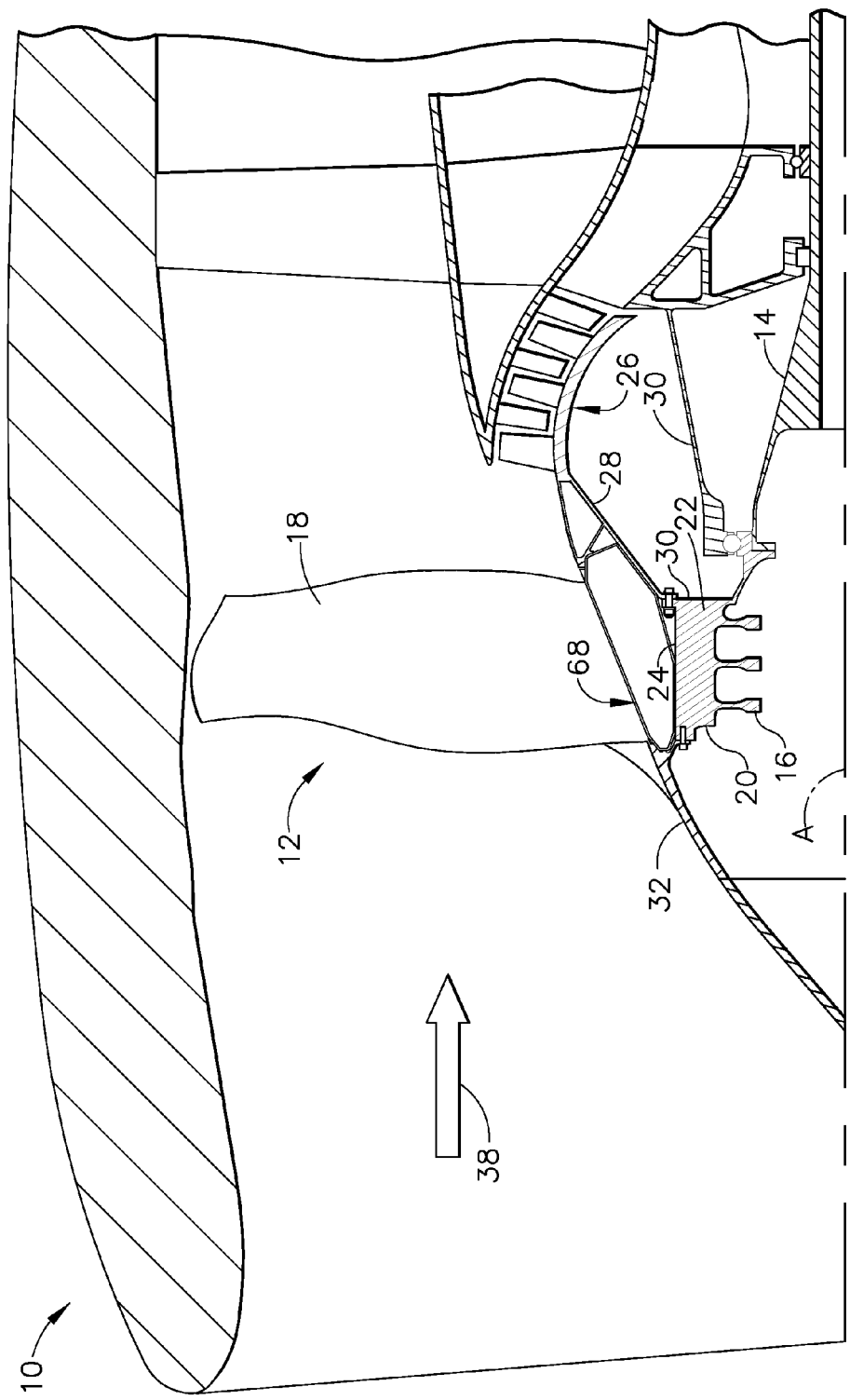
FIG. 1 is a schematic side view of a fan section of a gas turbine engine incorporating fan blades constructed in accordance with an aspect of the present invention.

Referring to the drawings wherein identical reference numerals denote the same elements throughout the various views, FIG. 1 shows a portion of an exemplary turbofan gas turbine engine 10 used for powering an aircraft in flight. The engine 10 includes a fan assembly 12 which is rotated about a central longitudinal axis "A" by a conventional fan shaft 14 powered by a conventional low pressure turbine (not shown). The fan assembly 12 includes a rotor disk 16 from which extends radially outwardly a plurality of circumferentially spaced apart fan or rotor blades 18 (only one shown in FIG. 1). The rotor blades 18 may be metallic or nonmetallic. For example, they may be made from a carbon fiber-epoxy composite or other similar material. The rotor disk 16 includes axially spaced apart forward and aft ends 20 and 22, respectively, and a radially outer surface 24 extending therebetween.

Disposed downstream of the fan assembly 12 is a conventional low-pressure compressor or "booster" 26 having axially spaced apart vane and blade rows, with the blades thereof being joined to a booster spool or shaft 28. The booster shaft 28 is suitably fixedly joined to the rotor disk aft side 22 by a plurality of bolts 30. A spinner 32 is joined to the rotor disk forward side 20 to provide an aerodynamic flow path for air 38 entering the fan assembly 12.

Figure 2:
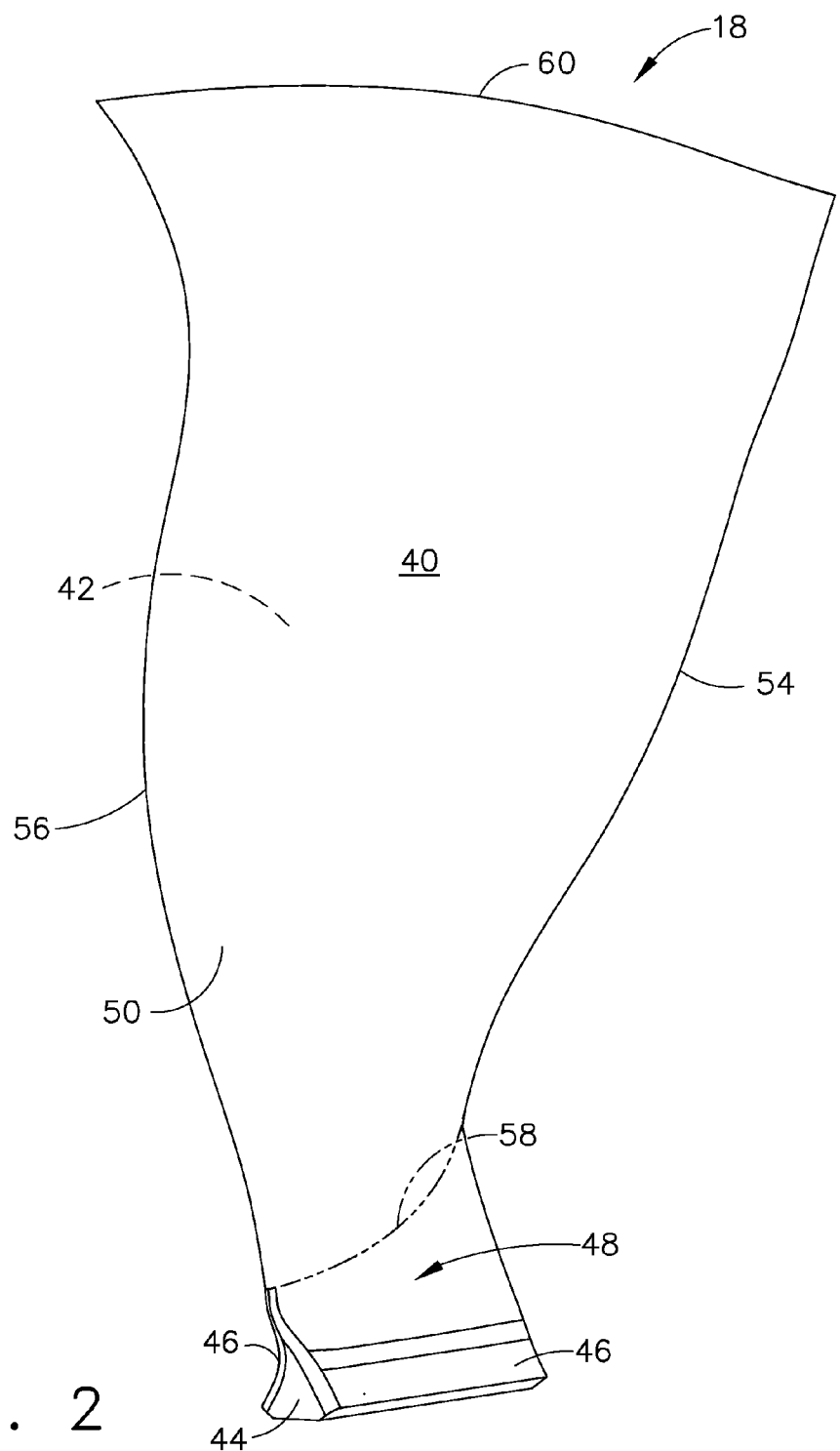
FIG. 2 is a perspective view of a fan blade of FIG. 1.
Figure 3:
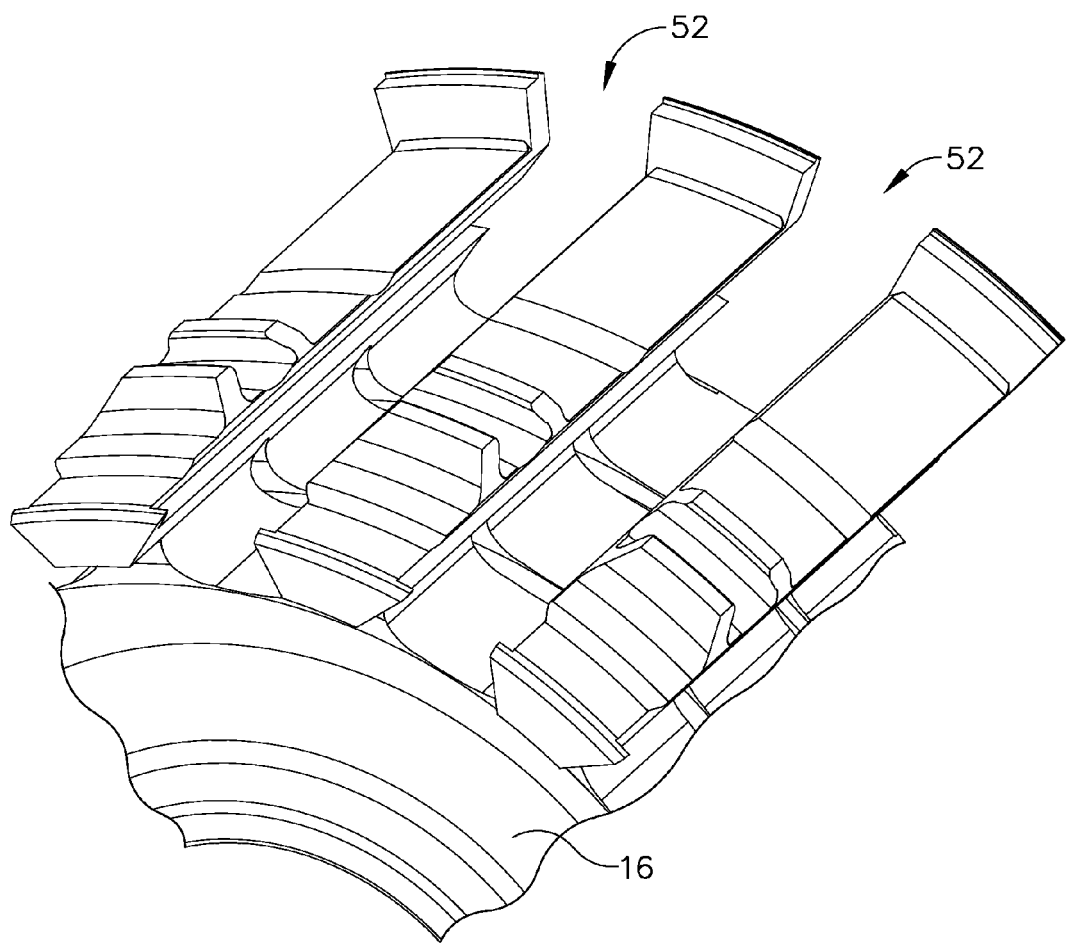
FIG. 3 is a perspective view of a rotor disk of FIG. 1.

FIG. 2 illustrates one of the fan blades 18. The fan blade 18 has a pressure side 40 and opposed suction side 42. Each of the fan blades 18 is an integral component including a root section in the form of a straight axial dovetail 44 with a pair of opposed pressure faces 46, a transition section 48, and an airfoil 50. The dovetails 44 are disposed in dovetail slots 52 of the rotor disk 16 (see FIG. 3) for attaching the fan blades 18 to the rotor disk 16. The airfoil 50 extends in a chordwise direction from a leading edge 54 to a trailing edge 56, and extends in a spanwise or radial direction from a root 58 to a tip 60. The fan blade 18 may be constructed from a variety of materials including metal alloys, nonmetallic composites, and combinations thereof. In the illustrated example, the fan blade 18 is constructed from a composite layup. The term "composite" refers generally to a material containing a reinforcement such as fibers or particles supported in a binder or matrix material. The composite layup may include a number of layers or plies embedded in a matrix and oriented substantially parallel to the pressure and suction sides 40 and 42. A nonlimiting example of a suitable material is a carbonaceous (e.g. graphite) fiber embedded in a resin material such as epoxy. These are commercially available as fibers unidirectionally aligned into a tape that is impregnated with a resin. Such "prepreg" tape can be formed into a part shape, and cured via an autoclaving process or press molding to form a light weight, stiff, relatively homogeneous article.

Figure 4:
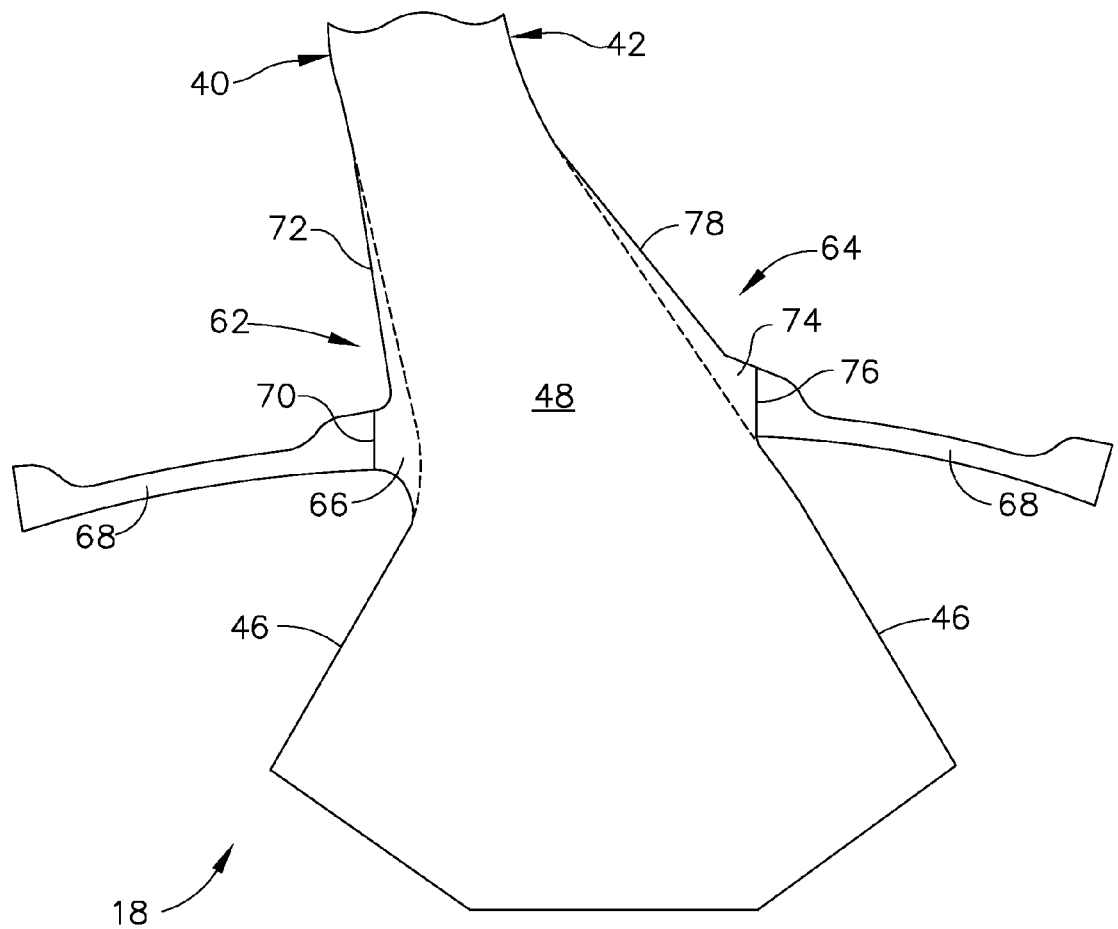
FIG. 4 is a cross-sectional view from a forward looking aft direction of one of the fan blades of FIG. 1.

In order to accommodate an inboard platform positioning, the transition section 48 of each fan blade 18 incorporates first and second shoulders 62 and 64 which are built-up regions extending laterally outward from the pressure and suction sides 40 and 42, respectively. As seen in FIG. 4, the shape of the first shoulder 62 includes a boss 66 at its lower end. The boss 66 is sized and shaped to interface with a platform 68, and includes a generally radially-aligned side face 70. the first shoulder 62 also includes an upper portion 72 which extends radially outward from the boss 66 and defines a tapering transition back to the nominal surface of the pressure side 40. Similarly, the second shoulder 64 includes a boss 74 with side face 76 and an upper portion 78. At the forward end of the fan blade 18, the first and second shoulders 62 and 64 protrude laterally beyond the nominal surfaces of the pressure and suction sides 40 and 42 (shown in dashed lines in FIG. 4) to their maximum extent. Moving in the aft direction, the degree of protrusion of the shoulders 62 and 64 tapers off. At approximately a mid-chord position the shoulders 62 and 64 are blended completely into the surfaces of the fan blade 18. The magnitude of the protrusion is exaggerated for illustrative purposes. It is noted that depending on the particular blade, only one of the first and second shoulders 62 and 64 may be required.

The shoulders 62 and 64 are non-structural elements, i.e. they are not expected to carry any significant aerodynamic or structural loads of the fan blade 18 during operation. Accordingly, they may be formed using any method that will provide the correct exterior shape and securely attach to or form part of the airfoil. For example, the individual shoulders 62 and 64 could be formed as composite preforms, cured, and then bonded to the fan blade 18 with a known type of adhesive. Alternatively, layers of composite plies could be built up on the sides of the fan blade and then co-cured along with the remainder of the fan blade 18.

Figure 5:
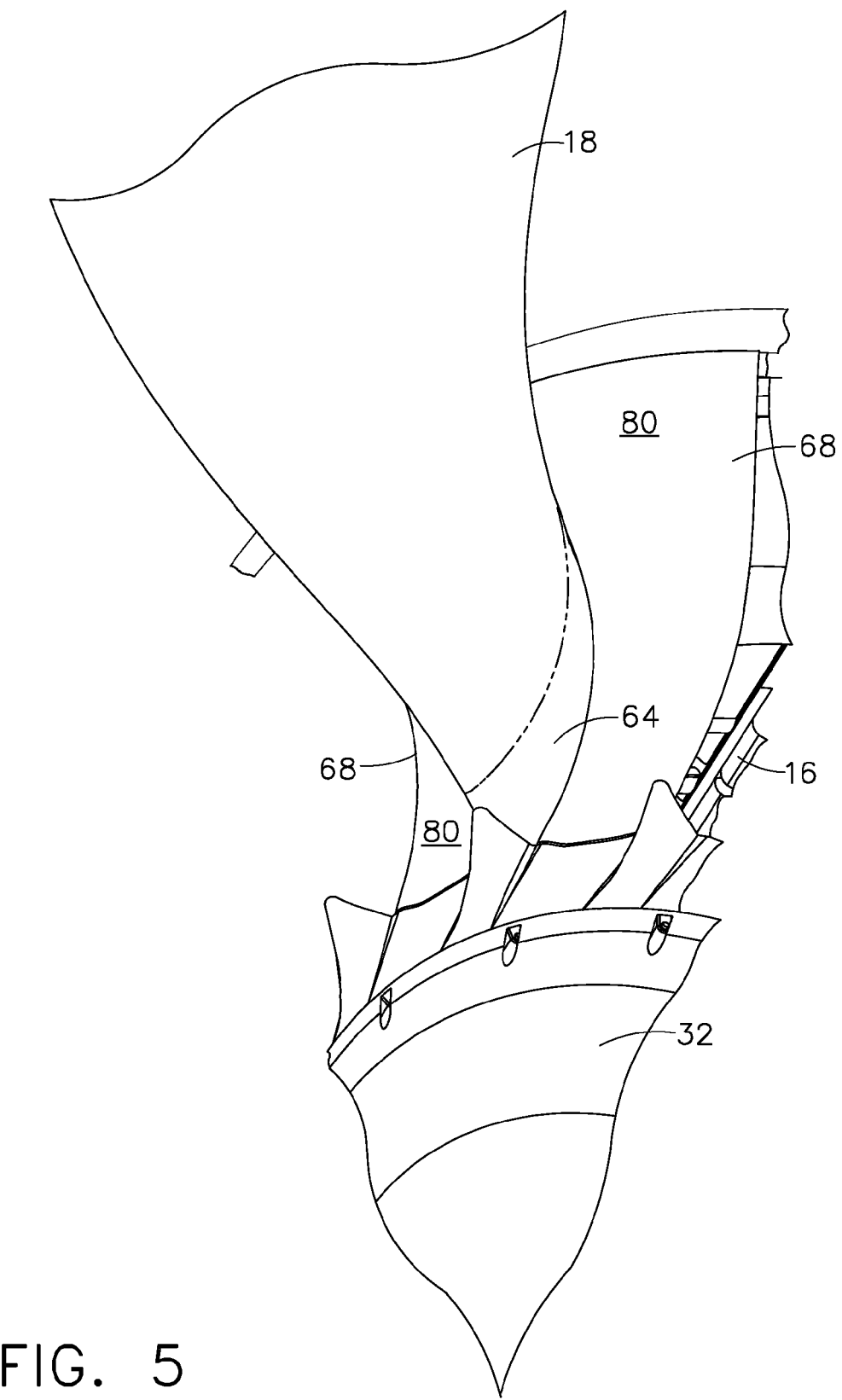
FIG. 5 is a perspective view of a portion of the fan of FIG. 1.

FIG. 5 illustrates one of the fan blades 18 assembled in the rotor disk 16 along with a spinner 32, and a platform 68 flanking each side of the fan blade 18. Each of the platforms 68 has a radially outer surface 80 extending between the respective adjacent fan blades 18 so as to collectively define an inner flowpath boundary for channeling air between the fan blades 18. The outer surface 80 of the platform 68 blends smoothly into the outer surface of the spinner 32 and into the shoulders 62 and 64 of the fan blade 18. Thus, the platforms 68 function to maintain the engine flowpath definition between the spinner 32 and the booster 26.

The outer surface 80 of each platform 68 is disposed at a substantially lower position (i.e. radially inward position) than it would be if a prior art fan blade were used. An example of the position of a prior art platform is shown by the dashed line running along the fan blade 18 in FIG. 5. This position results in a substantially lowered radius ratio for a given fan blade outer diameter. The interior construction of the platforms 68 and their attachment to the rotor disk 16 may be in accordance with known practices.

The fan blade 18 and fan assembly 12 described above has several advantages over the prior art. In particular, the present invention allows for an increase in fan flow area at the inner diameter of the fan (radius ration reduction) which directly translates to increased engine efficiency. The present invention allows the blade transition area between the dovetail and airfoil to be exposed to the flow path without creating major aerodynamic losses. Blade root or tip modifications are not required to obtain reduced radius ratio.

The foregoing has described a fan blade and fan assembly for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A fan blade for a gas turbine engine, comprising: a straight axial dovetail, an airfoil, and a transition section disposed between the dovetail and the airfoil, the fan blade having opposed pressure and suction sides, and further including at least one shoulder protruding from a nominal surface of a selected one of the pressure and suction sides, wherein the at least one shoulder includes a boss defining a side face, and an upper section extending radially outward from the boss and tapering inward to join a nominal surface of the selected side, wherein the dovetail, airfoil, and transition section are formed as a composite layup comprising a plurality of layers of fibers embedded in a matrix.

2. The fan blade of claim 1 wherein the at least one shoulder runs in a generally axial direction.

3. The fan blade of claim 1 wherein the dovetail includes a pair of opposed pressure faces.

4. The fan blade of claim 1 wherein the airfoil comprises spaced-apart leading and trailing edges extending between a root and a tip of the airfoil.

5. The fan blade of claim 1 wherein the at least one shoulder is integrally-formed with the remainder of the fan blade.

6. The fan blade of claim 1 wherein the at least one shoulder protrudes to a maximum extent at a leading edge of the fan blade, and tapers off in an axially rearward direction.

7. The fan blade of claim 1 wherein first and second shoulders protrude from the pressure and suction sides, respectively.

8. A rotor assembly comprising:
a rotor disk including an annular array of dovetail slots;
an array of fan blades each having:
a straight axial dovetail engaged in one of the dovetail slots of the rotor, an airfoil, and a transition section disposed between the dovetail and the airfoil, the fan blade having opposed pressure and suction sides, and further including first and second shoulders protruding from nominal surfaces of the pressure and suction sides, respectively, each shoulder including a boss defining a side face, and an upper section extending radially outward from the boss and tapering inward to join a nominal surface of the respective side of the fan blade, wherein a plurality of spaces are present between adjacent fan blades, and wherein the dovetail, airfoil, and transition section are formed as a composite layup comprising a plurality of layers of fibers embedded in a matrix; and
an array of platforms disposed in the spaces between adjacent fan blades, each platform having an outer surface defining a portion of a flowpath boundary and abutting the side faces of the shoulders of adjacent blades.

9. The rotor assembly of claim 8 wherein the shoulders run in a generally axial direction.

10. The rotor assembly of claim 8 wherein the dovetail includes a pair of opposed pressure faces.

11. The rotor assembly of claim 8 wherein the airfoil comprises spaced-apart leading and trailing edges extending between a root and a tip of the airfoil.

12. The rotor assembly of claim 8 wherein the shoulders are integrally-formed with the remainder of the fan blade.

13. The rotor assembly of claim 8 wherein the shoulders protrude to a maximum extent at a leading edge of the fan blade, and taper off in an axially rearward direction.

* * * * *